US007721106B2

(12) United States Patent
Zhang

(10) Patent No.: US 7,721,106 B2
(45) Date of Patent: May 18, 2010

(54) TRANSITIVE AUTHENTICATION AUTHORIZATION ACCOUNTING IN THE INTERWORKING BETWEEN ACCESS NETWORKS

(75) Inventor: Junbiao Zhang, Bridgewater, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 579 days.

(21) Appl. No.: 10/512,674

(22) PCT Filed: Mar. 12, 2003

(86) PCT No.: PCT/US03/07623
§ 371 (c)(1),
(2), (4) Date: Oct. 26, 2004

(87) PCT Pub. No.: WO03/092218

PCT Pub. Date: Nov. 6, 2003

(65) Prior Publication Data

US 2005/0154895 A1    Jul. 14, 2005

Related U.S. Application Data

(60) Provisional application No. 60/376,160, filed on Apr. 26, 2002.

(51) Int. Cl.
G06F 21/00 (2006.01)
H04L 9/32 (2006.01)
G06F 15/173 (2006.01)
G06F 7/04 (2006.01)
H04J 3/00 (2006.01)
H04J 3/14 (2006.01)
H04L 12/24 (2006.01)
H04B 7/00 (2006.01)

(52) U.S. Cl. .................. 713/182; 726/3; 726/5; 726/10; 709/225; 370/337; 713/170

(58) Field of Classification Search .......... 726/3–10; 455/426; 713/182
See application file for complete search history.

(56) References Cited

U.S. PATENT DOCUMENTS 5,539,824 A    7/1996    Bjorklund et al.
(Continued)

FOREIGN PATENT DOCUMENTS

GB            2402842 A    *  12/2004
JP            2001-524777 T     12/2001
WO       WO 99/27678 A2      6/1999

OTHER PUBLICATIONS

Ashutosh Dutta, Tao Zhang, Sunil Madhani, Kenichi Taniuchi, Kensaku Fujimoto, Yasuhiro Katsube, Yoshihiro Ohba, Henning Schulzrinne, Secure universal mobility for wireless internet, Oct. 2004, WMASH '04: Proceedings of the 2nd ACM international workshop on Wireless mobile applications and services on WLAN hotspots, pp. 71-80.*
(Continued)

Primary Examiner—Matthew B Smithers
Assistant Examiner—Courtney D Fields
(74) Attorney, Agent, or Firm—Robert D. Shedd; Joseph J. Opalach; Jerome G. Schaefer

(57) ABSTRACT

A method and a system for allowing a user device that has already been authenticated by a first communications network to gain access to a second communications network without undergoing authentication by the second communications network. The first communications network and the second communications network have a pre-established trust relationship there between. A packet is received from the user device that includes a user device public key, by the second network via the first network. A session key is sent from the second network to the user device, via the first network, when a source Internet Protocol (IP) address associated with the packet falls into a range allocated to the first network. The session key is encrypted with the user device public key. The user device decrypts the session key using a private key and uses the session key thereafter to access the second network. Further a mapping is generated to correlate the identity of the user device with the session key such that usage data relate to user device is generated by the second communications network and transmitted to the first communications network, which generates accounting information indicative of user device access of the second communications network.

18 Claims, 4 Drawing Sheets

U.S. PATENT DOCUMENTS

| | | |
|---|---|---|
| 6,115,699 A | 9/2000 | Hardjono |
| RE36,946 E | 11/2000 | Diffie et al. |
| 6,393,482 B1 * | 5/2002 | Rai et al. .................... 709/225 |
| 6,535,493 B1 | 3/2003 | Lee et al. |
| 2003/0139180 A1 * | 7/2003 | McIntosh et al. ............ 455/426 |

OTHER PUBLICATIONS

Search Report Dated June 12, 2003.

Tetsuya Kawase et al., "The Proposal of Secure Remote Access Using Encryption", The Institute of Electronics Information and Communication Engineers, Technical Report of IEICE, Aug. 25, 2004, pp. 1-9, vol. 97, Issue 493, Keio University, Yokohama, 223 Japan.

* cited by examiner

US 7,721,106 B2

TRANSITIVE AUTHENTICATION AUTHORIZATION ACCOUNTING IN THE INTERWORKING BETWEEN ACCESS NETWORKS

This application claims the benefit, under 35 U.S.C. § 365 of International Application PCT/US03/07623, filed Mar. 12, 2003, which was published in accordance with PCT Article 21(2) on Nov. 6, 2003 in English and which claims the benefit of U.S. Provisional Patent Application No. 60/376,160, filed Apr. 26, 2002.

BACKGROUND OF THE INVENTION

1. Field of the Invention

The present invention generally relates to networking and, more particularly, to method for transitive Authentication Authorization and Accounting (AAA) in the interworking between access networks.

2. Background of the Invention

Typically, Authentication, Authorization and Accounting (AAA) are required to access and utilize networks such as cellular networks and Wireless Local Area Networks (WLANs). In an environment in which a mobile terminal has multiple network access mechanisms, providing AAA interworking among these networks is of great importance. However, it is generally the case that one or more of the involved networks have a closed AAA scheme and it is difficult for one of the networks to use the AAA structure of another one of the networks and vice versa. For example, cellular networks have an AAA infrastructure that is not compatible with Internet based AAA and cannot be easily accessed through Internet protocols, even though the involved networks (including the cellular networks) have external IP connectivity.

Convention approaches for providing AAA interworking all require a special interworking function between the networks, even for AAA interworking between networks that have pre-established trust relationships amongst themselves. Using this interworking function, e.g., network B will then access network A's AAA infrastructure to authenticate a user which has already been authenticated by network A (through a closed network AAA mechanism). The conventional approaches do not take advantage of the fact that the user has already been authenticated by network A which has pre-established trust relationship with network B.

Accordingly, it would be desirable and highly advantageous to have a method for transferring the trust that is attributed to a user by one network from that network to another network, particularly without requiring any special interworking function to accomplish the same.

SUMMARY OF THE INVENTION

The problems stated above, as well as other related problems of the prior art, are solved by the present invention, a method for transitive Authentication Authorization and Accounting (AAA) in the interworking between access networks.

According to an aspect of the present invention, there is provided a method for allowing a user device that has already been authenticated by a first network to gain access to a second network. The first network and the second network have a pre-established trust relationship there between. A packet is received from the user device that includes a user device public key, by the second network. A session key is sent from the second network to the user device when a source Internet Protocol (IP) address associated with the packet falls into a range allocated to the first network. The session key is encrypted with the user device public key. The session key is for permitting the user device to access the second network.

These and other aspects, features and advantages of the present invention will become apparent from the following detailed description of preferred embodiments, which is to be read in connection with the accompanying drawings.

DETAILED DESCRIPTION OF THE INVENTION

The present invention is directed to a transitive Authentication Authorization and Accounting (AAA) scheme for an interworking between access networks. It is to be appreciated that the present invention is applicable to any combination of access networks. However, the present invention is particularly applicable to cellular network and Wireless Local Area Network (WLAN) interworking.

The present invention transfers the trust on a user by a first access network to a second access network where the first and the second access networks have a pre-established trust relationship. In contrast to the prior art, the present invention does not require any special interworking function between the two networks, but rather relies on IP addressing and routing schemes to verify user access right. It is to be appreciated that the present invention is also referred to herein as transitive AAA.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

Figure 1:
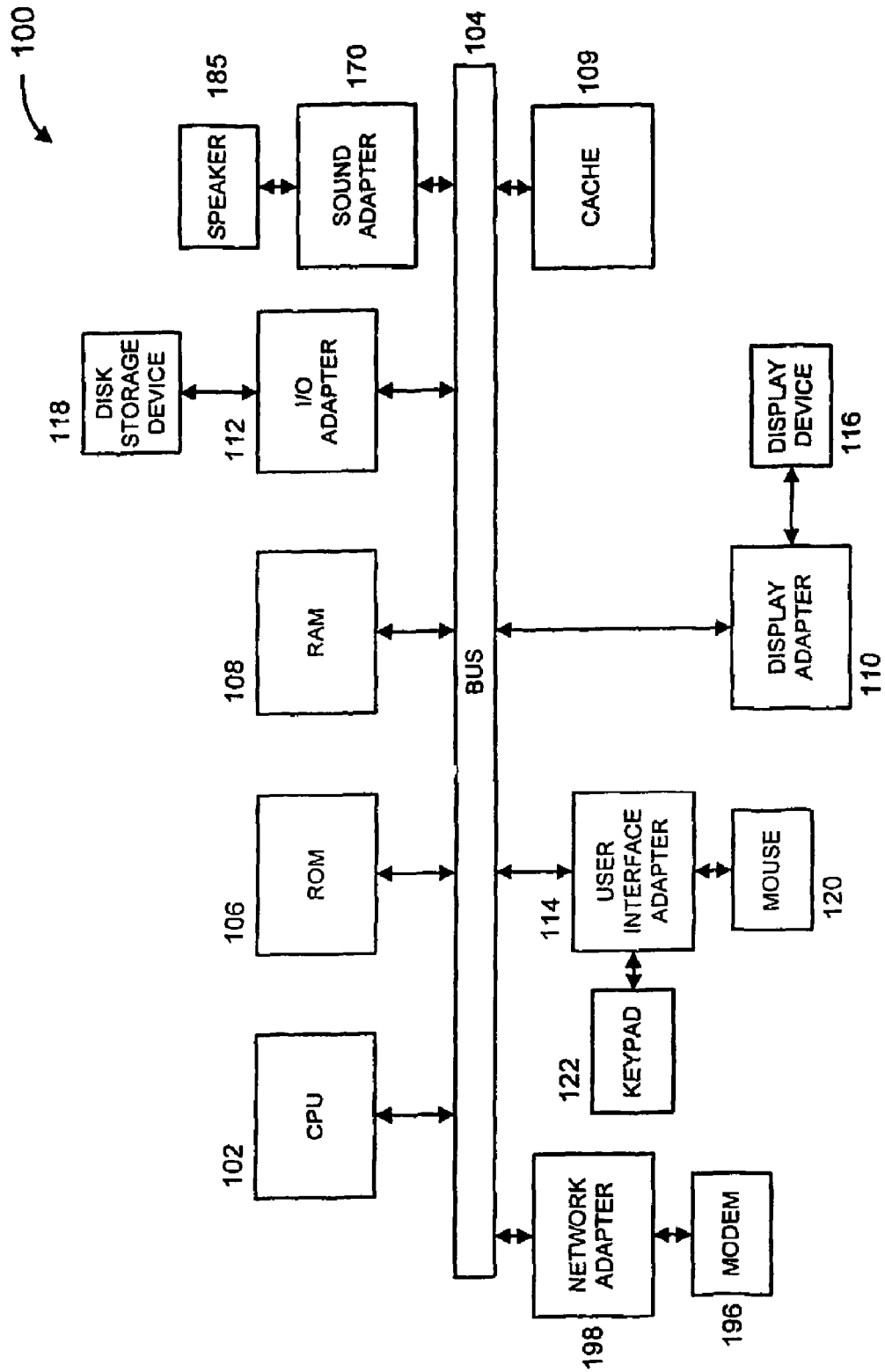
FIG. 1 is a block diagram illustrating a computer system 100 to which the present invention may be applied, according to an illustrative embodiment of the present invention.

FIG. 1 is a block diagram illustrating a computer system 100 to which the present invention may be applied, according to an illustrative embodiment of the present invention. The computer processing system 100 includes at least one processor (CPU) 102 operatively coupled to other components via a system bus 104. A read only memory (ROM) 106, a random access memory (RAM) 108, a display adapter 110, an I/O adapter 112, a user interface adapter 114, a sound adapter 199, and a network adapter 198, are operatively coupled to the system bus 104.

A display device 116 is operatively coupled to system bus 104 by display adapter 110. A disk storage device (e.g., a magnetic or optical disk storage device) 118 is operatively coupled to system bus 104 by I/O adapter 112.

A mouse 120 and keyboard/keypad 122 are operatively coupled to system bus 104 by user interface adapter 114. The mouse 120 and keyboard/keypad 122 are used to input and output information to and from system 100.

At least one speaker (herein after "speaker") 185 is operatively coupled to system bus 104 by sound adapter 170.

A (digital and/or analog) modem 196 is operatively coupled to system bus 104 by network adapter 198.

Figure 2:
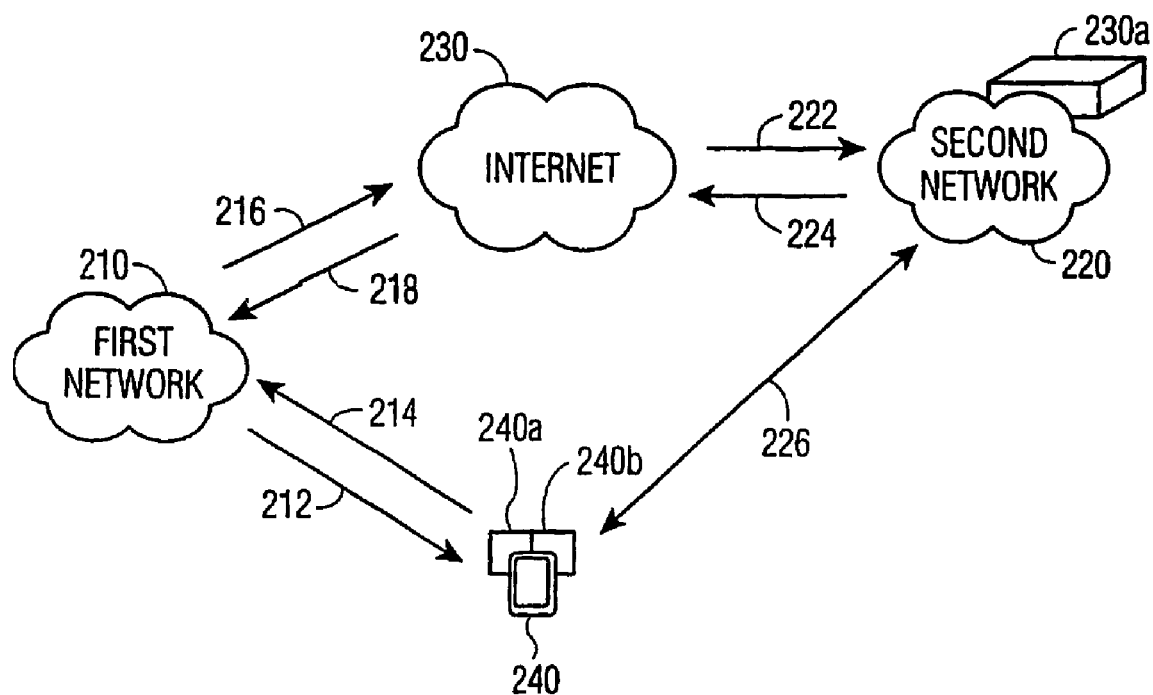
FIG. 2 is a block diagram illustrating a transitive AAA structure to which the present invention may be applied, according to an illustrative embodiment of the present invention.

FIG. 2 is a block diagram illustrating a transitive AAA structure to which the present invention may be applied, according to an illustrative embodiment of the present invention. In the illustrative embodiment of FIG. 2, the transitive AAA structure includes: a first network 210; a second network 220; the Internet 230, and a user device 240. The second network 220 includes an AAA server 230a. The user device 240 includes a first network interface 240a and a second network interface 240b. It is to be appreciated that while the present invention is described herein with respect to two networks, the present invention may be applied with any number and any types of networks, while maintaining the spirit and scope of the present invention.

For the purpose of illustrating the present invention, the following description thereof is made with respect to two networks, a 3G cellular network and a Wireless Local Area Network (WLAN). However, it is to be appreciated that the present invention may be applied to any number of networks in combination as well as any type of network, while maintaining the spirit and scope of the present invention.

In the illustrative example, user device 240 has dual radio interfaces for accessing the 3G network and the WLAN. According to the present invention, user device 240 is able to access WLAN 220 via the AAA mechanism of the 3G network 210 as follows. Upon detection of WLAN 220, user device 240 determines whether WLAN 220 supports transitive AAA. If so, user device 240 sends a registration message to the 3G network via path 214. The registration message includes a user public key. The registration message is transmitted to WLAN server 230a via the Internet as indicated by paths 216 and 222. Upon receiving the registration message, WLAN server 230a checks the source IP address to determine whether the received address is within a range of address for which transitive AAA is supported. If so, WLAN server 230 provides a session key that is encrypted with the user device public key and transmits the session key to 3G network 210 via the Internet as indicated by paths 224 and 218. The 3G network than transmits the session key to user device 240 as indicated by path 212. User device 240 then decrypts the session key using a user device private key and is able to gain access to WLAN 220 using the session key.

In this manner, user device 240 is able to gain access to WLAN 220 via the AAA mechanism of 3G network 210, as long as WLAN 220 supports transitive AAA and has a pre-existing trust relationship with 3G network 210. The present invention provides a mechanism for allowing a user device 240 to "roam" between WLANs that have a pre-existing relationship with the 3G network by directly using the AAA mechanism of the 3G network rather than having the WLAN contact the 3G AAA services for authentication or using the AAA mechanism associated with each WLAN.

The 3G cellular network is allocated a range of IP addresses; when the user uses the 3G cellular network for IP access, the source IP address will fall into this range. Given the routing scheme of the Internet, while any snooper can fake such a source IP address, when a return IP packet is sent, it can only be received by the user that actually has the IP address, unless the snooper can break into the routers that forward the IP packets. Thus, the present invention may provide an additional measure of security.

Figure 3:
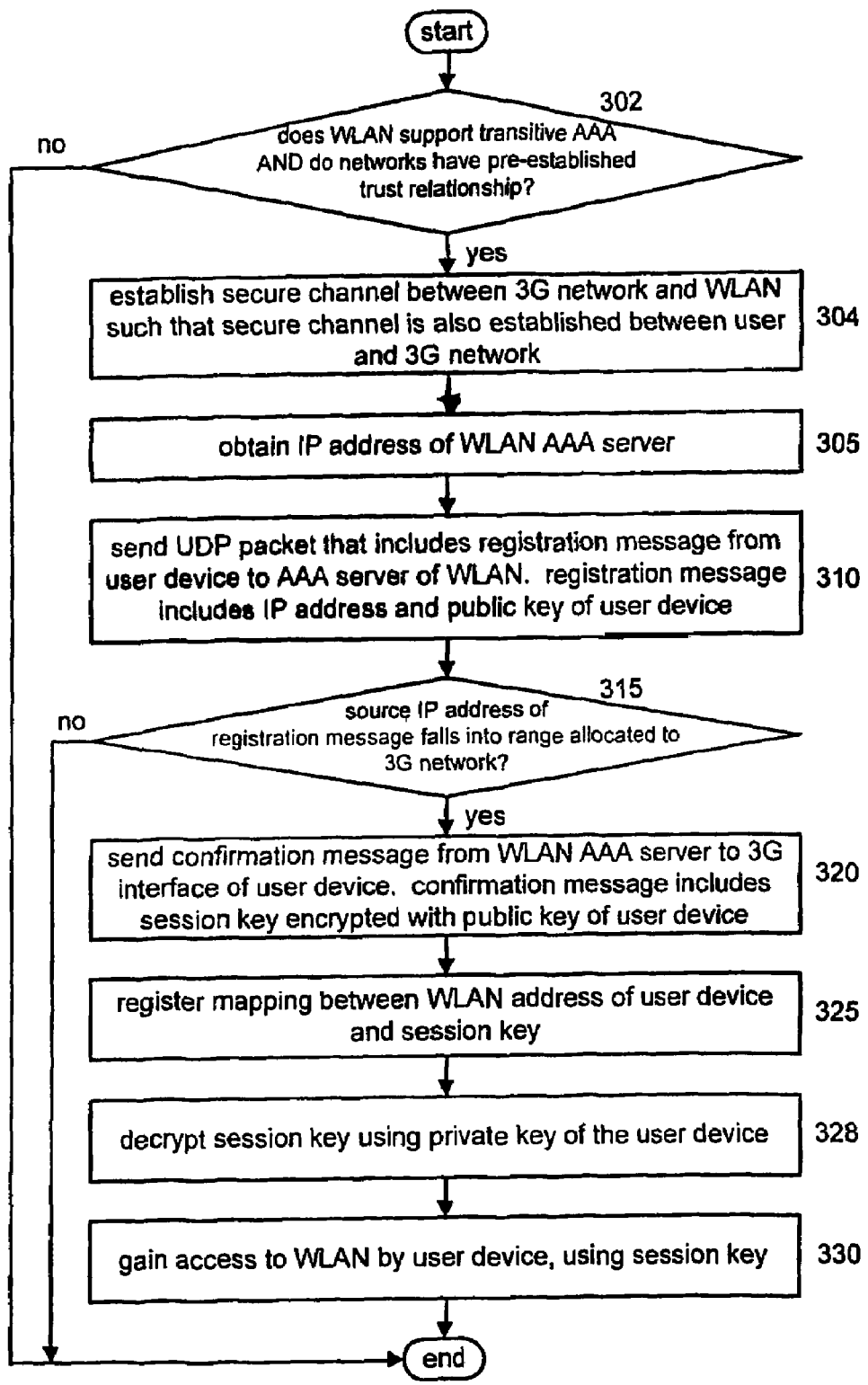
FIG. 3 is a flow diagram illustrating an AAA method for allowing a user device that has been authenticated by a 3G cellular network to gain access to a Wireless Local Area Network WLAN, according to an illustrative embodiment of the present invention.

FIG. 3 is a flow diagram illustrating an AAA method for allowing a user device that has been authenticated by a 3G cellular network to gain access to a Wireless Local Area Network WLAN, according to an illustrative embodiment of the present invention. The user device has two radio access interfaces (3G cellular and WLAN). The 3G cellular network and the WLAN have a pre-established trust relationship there between.

Upon the user device moving into an area under the coverage of the WLAN, it is determined (e.g., by the WLAN interface of the user device) whether the WLAN supports transitive MA and whether the 3G cellular network has a pre-established trust relationship with the WLAN (e.g. through broadcasting or Dynamic Host Configuration Protocol (DHCP)) (step 302). If not, then the method is terminated. Otherwise, step 304 is performed as described herein below and then the method proceeds to step 305. At step 305, the IP address of an AAA server of the WLAN (hereinafter WLAN AAA server) is obtained by the user device (step 305).

A User Datagram Protocol (UDP) packet that includes a registration message is sent from the user device to the WLAN AAA server, e.g., through the 3G cellular interface of the user device (step 310). It is to be appreciated that while step 310 is described with respect to a UDP packet, any type of packet may be employed including, but not limited to, a Transmission Control Protocol (TCP) packet. The registration message includes the WLAN address (e.g. Medium Access Control (MAC) address or IP address of the WLAN interface) of the user device, and the public key of the user device.

Upon receiving the registration message, the WLAN AAA server determines whether the source IP address of the registration message (e.g., an IP address of the 3G interface) falls into a range allocated to the 3G cellular network with which the WLAN network has a pre-established relationship (step 315). If not, then the method is terminated. Otherwise, the WLAN AAA server sends back a confirmation message to the 3G cellular interface of the user device (step 320). The confirmation message includes a session key that is to be used between the user device and the WLAN (session key permits the user device to access the WLAN); the session key is encrypted with the public key of the user device. The WLAN AAA server also registers a mapping between the WLAN address of the user device and the (assigned) session key (step 325). Step 325 is performed so that a given session key is associated with a corresponding user.

Upon receiving the confirmation message (e.g., via the 3G cellular interface of the user device), the session key is decrypted using a private key of the user device (step 328). Using the session key, access to the WLAN is obtained by the user device (step 330).

A description will now be given of a possible collaborative hacker attack on the method of FIG. 3. It is to be appreciated that the following attack is possible due to the use of IP addressing and IP routing without additional authentication support from the 3G cellular network. A hacker sends a registration message with a fake IP address that falls into the range of the 3G cellular network. The hacker then intercepts the confirmation message somewhere along the route between the WLAN and the 3G cellular core network. The hacker notifies another hacker within the WLAN coverage about the discovered key.

However, it is very difficult to accomplish the above attack, especially the step of intercepting the confirmation message. The hacker has to gain access to a router along the route between the WLAN and the 3G network, just for the purpose of obtaining a session key, and the two hackers have to collaborate to carry out the attack (assuming that a hacker within the coverage of the WLAN cannot get access to any of the routers discussed above because if the hacker could obtain access, then there would have been no point of carrying out the attack since the hacker would already have had Internet access).

To prevent the preceding collaborative hacker attack, step 304 is performed in the method of FIG. 3. At step 304, a secure IP channel (e.g. an Internet Protocol (IP) Security (IPSec) tunnel) is established between the WLAN AAA server and a Gateway General Packet Radio Service (GPRS) Serving/Support Node (GGSN) of the 3G cellular network. Since the path is also secure between the user and the GGSN of the 3G cellular network (as ensured by the 3G network security), the above attack can be thwarted.

Figure 4:
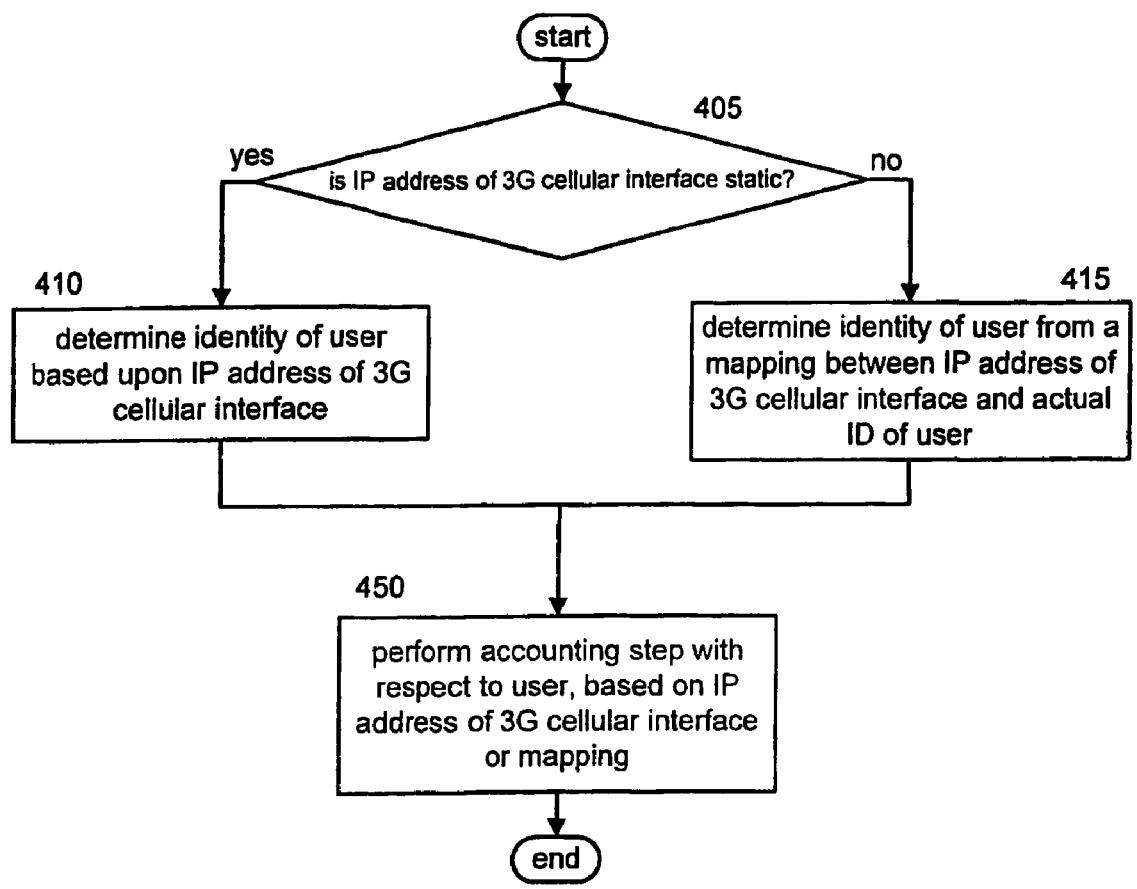
FIG. 4 is a flow diagram illustrating an accounting method for performing an accounting for the user of the user device of the method of FIG. 3, according to an illustrative embodiment of the present invention.

A description will now be given of an accounting method that may be employed along with the method of FIG. 3, according to an illustrative embodiment of the present invention. FIG. 4 is a flow diagram illustrating an accounting method for performing an accounting for the user of the user device of the method of FIG. 3, according to an illustrative embodiment of the present invention.

It is determined whether the IP address of the 3G cellular interface of the user device is a static IP address (step 405). If so, the identity of the user is determined based upon the IP address of the 3G cellular interface, (step 410), and the method proceeds to step 450. Otherwise (the IP address is dynamic), the identity of the user is determined from a mapping between the (temporary) IP address of the 3G cellular interface and the actual ID of the user (step 415), and the method proceeds to step 450. At step 450, an accounting step is performed with respect to the user based on the IP address of the 3G cellular interface (static IP address) or the mapping (dynamic IP address).

It is to be appreciated that for the purposes of the present invention, Network Address Translation (NAT) is treated the same as if the IP address of the 3G cellular interface were dynamic. Moreover, with respect to the mapping referred to at step 415 above, such mapping may be stored, e.g., at a DHCP server or a NAT server if NAT is used. It is to be further appreciated that the present invention is not limited to the use of mappings to determine user identity in the case of non-static IP address and, thus, other approaches may be employed, while maintaining the spirit and scope of the present invention.

Although the illustrative embodiments have been described herein with reference to the accompanying drawings, it is to be understood that the present invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for allowing a user device having dual radio interfaces to access a wireless local area network, comprising the steps of:
receiving, by a wireless local area network, from a cellular radio interface of the user device, via an internet network, a registration message that includes a user device public key, the user device having been authenticated by a cellular network, the wireless local area network having a pre-established trust relationship with the cellular network;
determining whether a source internet protocol address received from the cellular network is within a predetermined range of source internet protocol addresses, and if so,
generating a session key in response to the user device public key, the session key adapted to be decrypted using a user device private key,
transmitting the session key to the cellular network from the wireless local area network via the internet network, and
allowing a wireless local area network radio interface of the user device to access the wireless local area network using the session key.

2. The method according to claim 1, further comprising the step of establishing a secure internet protocol channel between the wireless local area network and the cellular network.

3. The method according to claim 1, further comprising the steps of receiving an address of an interface associated with the user device, and registering a mapping between the interface address and the session key.

4. The method according to claim 3, wherein the inter-face address comprises one of a Medium Access Control (MAC) address and an Internet Protocol (IP) address.

5. The method according to claim 3, further comprising the steps of generating usage data in response to the accessing of the wireless local area network by the user device, and transmitting the usage data to the cellular network, wherein accounting information for the user device is generated in response to the usage data.

6. A method for accessing a wireless local area network using a user device having a wireless local area radio interface and a cellular radio interface, comprising the steps of:
establishing communications with a cellular network and performing an authentication step with the cellular network using the cellular radio interface;
transmitting a registration message that includes a user device public key to the cellular network;
receiving by the user device from the cellular network a session key received from the wireless local area network in response to the registration message;
decrypting the session key with a private key; and establishing access to the wireless local area network using the wireless local area network radio interface and the session key.

7. The method according to claim 6, wherein the registration message includes an address associated with an interface for communicating with the wireless local area network, wherein a mapping is generated between the address and the session key.

8. The method according to claim 7, wherein the interface address comprises one of a Medium Access Control (MAC) address and an Internet Protocol (IP) address.

9. The method according to claim 8, further comprising the step of receiving accounting information regarding the user device access to the wireless local area network via one of the wireless local area network and the cellular network.

10. The method according to claim 6, further comprising the step of initially determining whether the cellular network has a pre-established trust relationship with the wireless local area network.

11. A method for allowing a user device having a cellular radio interface and a wireless local area network radio interface in communication with a cellular network to access a wireless local area network, the cellular network and the wireless local area network having a pre-established trust relationship therebetween, the method comprising the steps of:
   authenticating the user device within the cellular network;
   receiving from the user device, via the cellular radio interface, a registration message that includes a user device public key;
   transmitting, via an internet network, a message that includes the user device public key and a source address that falls within a predetermined range allocated to the cellular network to the wireless local area network;
   receiving, via the internet network, a session key from the wireless local area network; and
   transmitting the session key to the user device, wherein the session key allows the user device to access the wireless local area network using the wireless local area network radio interface.

12. The method according to claim 11, further comprising the step of establishing a secure internet protocol channel between the cellular network and the wireless local area network to prevent unauthorized interception of the session key.

13. The method according to claim 11, further comprising the step of receiving an address of an interface associated with the user device, and registering a mapping between the interface address and the session key.

14. The method according to claim 13, wherein the address of the interface comprises one of a Medium Access Control (MAC) address and an Internet Protocol (IP) address.

15. The method according to claim 13, further comprising the step of receiving usage data from the wireless local area network indicative of user device access of the wireless local area network and generating accounting information associated with the user device based on the usage data.

16. The method according to claim 11, wherein the session key is encrypted using the user device public key, and is adapted to be decrypted using a user device private key.

17. A method for accessing a wireless local area network using a user device having a cellular radio interface and a wireless local area network radio interface, said method comprising:
   establishing, by said user device, communications with a first communications network using the cellular radio interface, said first communications network authenticating said user device;
   transmitting a registration message by said user device, to said wireless local area network using a user public key via said first communications network;
   receiving, by said user device, from said wireless local area network via the first communications network, a session key generated in response to said registration message;
   decrypting, by said user device, said session key using a user private key; and
   establishing secure communications using the wireless local area network radio interface of the user device, with said wireless local area network using said session key.

18. The method according to claim 17, wherein said first communications network is a cellular network.

* * * * *